Jan. 20, 1970          M. M. BOWMAN, JR          3,490,680
                            BAG

Filed Feb. 29, 1968                      2 Sheets-Sheet 1

INVENTOR.
M.M. BOWMAN, JR.
BY *Young & Quigg*
ATTORNEYS

INVENTOR.
M.M. BOWMAN, JR.

BY Young & Quigg

ATTORNEYS

United States Patent Office 3,490,680
Patented Jan. 20, 1970

3,490,680
BAG
Mark M. Bowman, Jr., Bartlesville, Okla., assignor to Phillips Petroleum Company, a corporation of Delaware
Filed Feb. 29, 1968, Ser. No. 709,459
Int. Cl. B65d 31/12, 27/10
U.S. Cl. 229—53         4 Claims

ABSTRACT OF THE DISCLOSURE

In an embodiment a tubular film or fabric which can be flat, slit or slotted, cut to a desired length, and sealed across its ends. The slit or slot can be scalloped. The slit or slot now preferably is formed prior to heat or otherwise sealing across the tube but can be formed simultaneously with the sealing or even thereafter. Thus, in a now preferred embodiment, after formation of the slot, the tube rolled by moving its longitudinal axis at right angles to itself so that the slot appears in full view, i.e., the unslotted portion of the tube is fully viewable through the slotted portion, the tube is then flattened, so that the slot ends coincide with or fall intermediate the creases thus formed and then the tube is transversely sealed.

In a further now preferred different embodiment, plastic sheet or slit tubing is folded over on longitudinal folding lines. The folded over portions may overlap, preferably at a center longitudinal line. Again, transverse heat sealing is accomplished using a seal wide enough to permit cutting. The sealing and cutting can be simultaneously accomplished.

The end product be formed into a saddle-type bag which can be filled with sand, shoes, or other objects.

---

This invention relates to a bag. It also relates to a method of making a bag. In one of its aspects the invention relates to a rapid, convenient method of making bags. In another of its aspects, the invention relates to a method of making saddle bags, useful as sand bags or to contain other materials. In another of its aspects, the invention relates to a bag which is produced by the invention.

In one of its concepts the invention provides a method for making a bag such as a sand bag or container from a tubular film or fabric by slitting or slotting the film and sealing the thus cut film or fabric across its length at desired intervals to encompass the slit portion between two seals thus formed, the seals being in a now preferred embodiment, substantially at right angles the axis of the tube. In another concept the method involves positioning the slit portion of the tube substantially above, or to encompass adjacent the slit, the nonslit remainder of the circumference of the tube, thus sealing the ends of the tube across its length intermediate several slit portions, and then cutting the tube into bag portions by slicing through the sealed portions, thus to form a saddle bag-type of container, i.e., a two-pocketed bag. In another of its concepts the invention provides for slitting the tube while in substantially flattened condition to cause a cut extending approximately one-half the circumference of the tube at the slit portion and then proceeding as before. In a further concept of the invention, it provides for the production of a saddle bag-type container in which, in lieu of a slit, a portion of the tube is removed to create a slot which can be variously shaped or scalloped.

Stated otherwise according to a now preferred concept of the invention the slit or slot is formed prior to heat or otherwise sealing across the tube and after formation of the slit or slot the tube is rolled by moving its longitudinal axis at right angles to itself so that slot is, as it were, in full view on top of the tube so that the unslotted portion of the tube is fully viewable through the slotted portion, then flattening the tube so that the slot ends preferably coincide with the creases thus formed and then sealing the tube transversely to provide two ends of the saddle bag thus formed.

In a further concept still a material is folded over on longitudinal folding lines so that the folded over portion can overlap, preferably at a center longitudinal line of the folded material whereupon transverse sealing, as by heat sealing, is accomplished using methods and apparatuses known in the art. Wherever sealing and cutting are practiced it is possible to seal and cut simultaneously.

The art on formation of bags is replete with various suggestions of how to proceed to make a bag. Further there are any number of apparatuses or other devices for making bags. Bags must be made to be sturdy, effective, preferably rot- and burn-proof and rapidly at very low cost. The military require, as do the civilian authorities, bags which can be conveniently filled as with sand for military and civilian uses which are evident to the reader.

I have now conceived a new bag and a method for making same. The bag can be made, and indeed preferably will now be made, employing tubular film of plastic such as polyolefin film which can be heat sealed. However, other film or fabric which need not be made of a plastic or polyolefin can be used or, woven materials or fabrics made of polyolefin or at least in part of a plastic can also be used.

It is an object of this invention to prepare a bag. It is another object of this invention to cheaply, yet effectively, produce a bag from flat film. It is a further object of this invention to produce a bag from tubular film. It is a further object of this invention to produce a bag, like unto a saddle bag, from a film or fabric. It is a further object of the invention to rapidly produce with a minimum of operations a foldable, readily fillable saddle bag.

Other aspects, concepts, and objects of this invention are apparent from a study of this disclosure, the drawing and the appended claims.

According to the present invention, in one of its forms, a bag or container can be rapidly produced by using a tube or a flat material formed into the shape of a tube, slitting or slotting the tube at least part way across but not completely across substantially at right angles to its longitudinal axis. This produces a slotted tube which can be used as such or rolled so that the slit or opening in its wall substantially encompasses the unslit or unslotted portion thereof so that the unslit or unslotted portion thereof substantially encompasses the slit or slotted portion thereof. The tube is then sealed at its ends to encompass the slit or slot. The bag is then formed by folding along the periphery remaining at the slit or slotted portion to form a saddle bag-type bag. Further, according to the present invention there is provided a method for producing a bag as herein described wherein a sheet or film of fabric or plastic is longitudinally folded along two folds so that the longitudinal edges meet preferably at a point substantially midway between the fold, the folded material is now sealed against itself by heat sealing, stitching or otherwise, the sealed portion being wide enough and positioned transversely of the longitudinal axis of the film or fabric so that a cut can be made, cutting through the sealed portions to remove a container or bag thus formed. The bag can be folded with a fold line just below the opening therein to form a bag like unto a saddle bag.

When stitching is employed, there will be employed preferably closely adjacent lines of stitching so that cutting can be practiced between the stitching lines when a plurality of bags is desired to be made from one piece of film or fabric. It will be undertood by one skilled in the art having studied this disclosure that the methods herein described can be used to make a single bag. However, the primary object of the invention is to prepare a great many bags or a plurality of them rapidly and efficiently as well as cheaply.

By sealing, as by heat sealing, or stitching transversely of the tubular or flattened but folded or flattened tubular material, it is possible to provide compartmentalization of the bag. Thus, according to the present invention as set forth in the statement of invention first appearing herein longitudinal stitching or sealing at one or more places along the length of the material or film can be practiced. Preferably, the slit or slotted portion will have been placed in the position in which it is desired to have the same before bending at the same to form the two-container portion bag whereupon the sealing or stitching can be practiced so that upon bending or folding to form the saddle bag shape each container of the saddle bag will be sub-divided into a plurality of compartments.

Further, according to the present invention as set out in the second statement of invention above made, the sealing or stitching is made transversely across the material or plastic, preferably at the same time as the other seals or stitching. By cutting say only every other seal, there is obtained a bag portion which has two saddle bag-type containers, each of which is formed to have two compartments. One skilled in the art in possession of this disclosure having studied the same will recognize that it is possible to cut skipping two or more stitched or sealed lines so that each container of the saddle bag will be formed having more than two compartments.

Herein and in the claims the term "slit" is taken to be interchangeable but not to mean the same as the term "slot." Further, herein and in the claims the term "seam" is taken to be interchangeable with the term "seal," albeit not necessarily to be taken to mean identically the same.

In the drawing FIGURES 1 and 2 are plan views of a flattened tubular film of plastic. FIGURE 1 shows the tube just after cutting through two thicknesses of the film to form a scalloped slot. FIGURE 2 shows the same piece but after it has been rolled at right angles to its axis to reveal all of the slotted portion. FIGURE 2 additionally shows transverse seal lines made to form bag portions and longitudinal seal lines adapted to compartmentalize the containers of the bags to be formed. FIGURE 3 merely shows the portion of film cut out from the tube. FIGURE 4 shows a folded-together, overlapped piece of plastic film, seal lines for cutting out a bag portion and intermediate seal lines for compartmentalizing the bag pockets or containers. FIGURE 5 is a vertically taken cross section across the longitudinal axis of FIGURE 4. FIGURES 6 and 7 show the respective bags being filled. FIGURE 8 shows the bags in one kind of stacked relationship as would be suitable for a dike.

Referring now to the drawings, FIGURE 1 shows a flattened tubular piece of plastic film 1 which has been scalloped to remove the portion of plastic indicated at 2. FIGURE 2 shows the same tubular portion of plastic film when it has been rolled moving its longitudinal axis at right angles to itself so as to expose the entire scalloped portion of the tube. FIGURE 3 depicts the portion of the plasic film, 2a, which has been removed when cutting the scalloped portion of FIGURE 1. Wide lines 3 and end lines 4 are at portions of the tube which have been heat sealed. Thus, FIGURES 1 and 2 show a portion of tube which has been cut from, say a longer piece of tubing and this portion encompasses three containers or bags in the making. Upon slicing through seals 3 there are obtained three bag portions, each of which can then be folded under the scalloped portion to form like unto a saddle bag. In FIGURE 2, lines 5 are heat sealing lines which compartmentalize each container of each saddle bag portion into three compartments.

FIGURE 4 and FIGURE 5 show in plan and sectional view the preparation of a bag according to another embodiment of the invention in which the plastic film is folded over along lines 10 to overlap at 11. This overlapping is in no way sealed if a bag to have an opening extending completely thereacross is desired. It can be sealed to an extent if desired.

Wide seals 12 are provided across the folded plastic sheeting to the overlapped portion. Cuts through these wide seals produce individual bag portions which folded over backwards at the overlap will produce like unto a saddle bag having two compartments. Seal lines 13 can be provided, if desired, to compartmentalize each bag as before discussed.

Figures 6, 7:
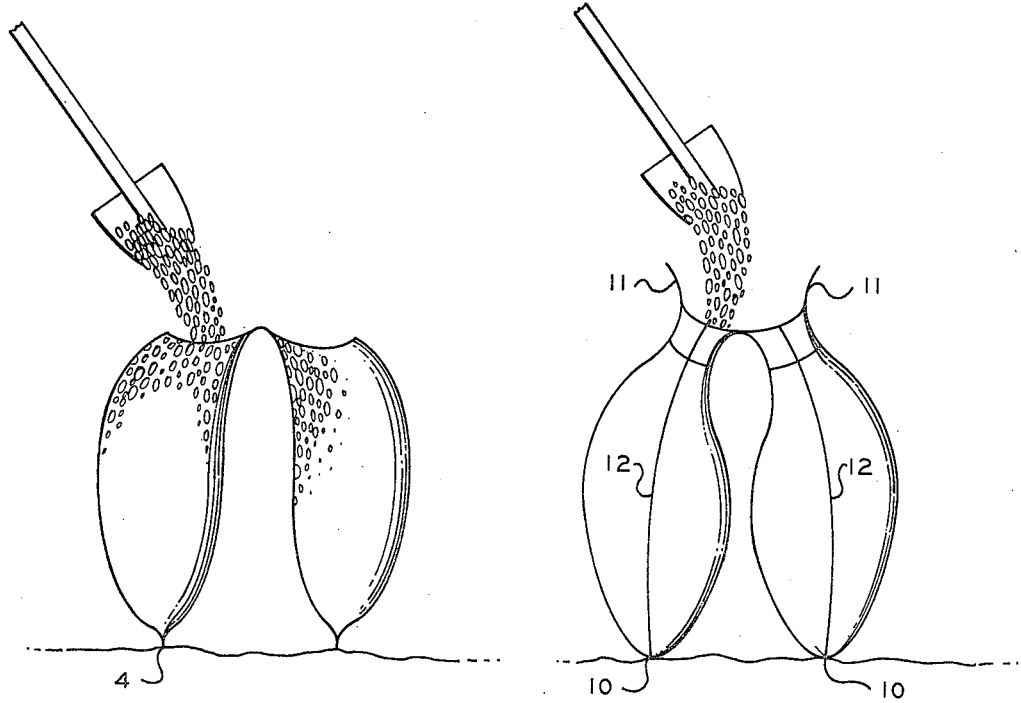
FIGURE 6 shows a bag made according to the procedure outlined in connection with FIGURES 1 and 2, the bag being in filling postion. It will be noted that the seals are found at the bottoms of the containers at 4.
FIGURE 7 shows a bag made according to the procedure outlined in connection with FIGURE 4 and shows seals or sealed portions 12, the fold lines 10 being at the bottoms of the containers of the bag.
Figure 8:
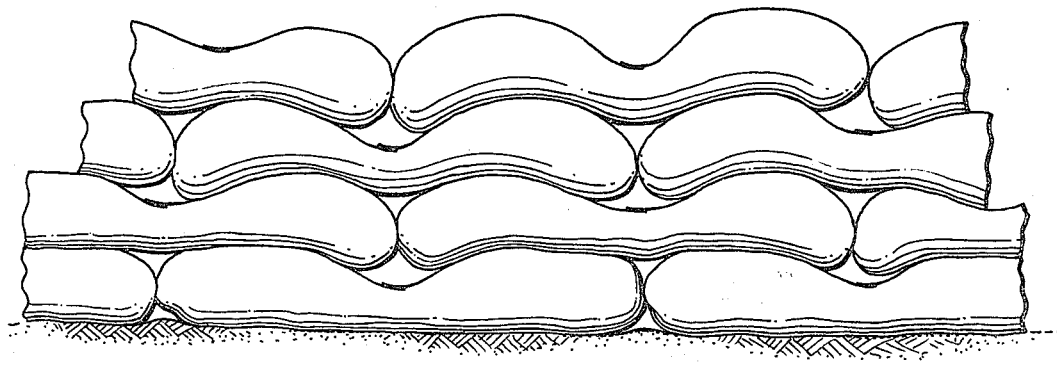

Referring now to FIGURE 7, the folded over portion 11 of the fabric or plastic is shown in open position, during filling. After filling, the overlapped portions can be closed and stitched or heat sealed or otherwise secured together. Obviously, it is within the scope of the invention and the claims thereto to provide more or less overlap or no overlap at all so that a completely closed, partially closed, or unclosed filled container or bag is obtained.

EXAMPLE I

An elastomer-modified high density linear polyethylene, .940 density, is used for bag manufacture. A blown film tubing made by conventional methods having 7 mil wall thicknes and 16" wide when flat is cut to 144" length. Scalloped cuts of 1" minimum to 3" maximum wdith are made through both walls starting at the edge and extending halfway across the transverse direction at 24" from each end and at the center. The scalloped sections are removed and the tubing rolled until the entire scalloped or slit section is in front of the corresponding uncut portion. Conventional impulse sealing methods are used to provide seals across each end and two intermediate seals 1" wide are made across the transverse dimention 48" from each end. The two intermediate seals are then cut leaving one-half inch wide seals on each side of the cut and providing three saddle type bags with nominal dimensions 16" x 24" on each side of the center opening or 16" x 48" overall.

EXAMPLE II

An elastomer-modified high density linear polyethylene film, .940 density, 7 mil wall thickness, is used for bag manufacture. A blown film tubing made by conventional means being 51" wide when laid flat and 72" long is slit longitudinally and folded so the cut edges overlap 3". Seals 1" wide are made by a conventional impulse sealer at each end and at 18" intervals along the transverse direction extending from the fold line to the overlap area. The intermidiate seals are then cut leaving one-half inch wide seals on each side of the cut and providing saddle type bags with nominal dimensions of 18" x 24" on each side of the center opening at the overlap or 18" x 48" overall.

It will be evident that the bags or containers made according to the invention have different designs in that one bag has a seam at the heat sealing along the end walls, so to speak, of the bag pockets whereas another has the seams along the bottoms of the bag pockets when viewing these bags in open, upright, filling position.

The invention is primarily concerned with the configuration of the materials when being cut, slit, or otherwise worked upon and not with the material of construction per se, albeit in that embodiment in which plastic is used, the combination of the plastic heat sealing techniques and places of heat sealing constitute a very important part of the invention, as wil be understood.

The film, plastic or material of which the bags are ultimately produced can be any of the known plastics such as polyolefins, e.g., polyethylene, polypropylene, or other cheap material commonly known in the art. The bags can be made of material impervious to liquid or it can be made of woven materials which may or may not have been treated to render them rot resistant or moisture proof. The bags of the invention can be made of canvass or duck and can be stitched instead of heat sealed to form a seal, i.e., to close the portion which ultimately is the bag bottom when it is in upright position as shown in FIGURES 6 and 7.

Although the slitting or slotting, as at the scalloping tube, has been shown to be substantially at right angles to the longitudinal axis of the laid-out tubing, it is obvious that the scalloping can be made at an angle to or more or less parallel with the longitudinal axis of the tubular material as laid out, at least for a part thereof, so that in open, upright position, the bag opening will extend down the side of each pocket.

Further, although as shown in the figures, the openings are of length to extend substantially across the full length of the fold line of the bag in an upright position, it is possible to cut a lesser or greater portion of the circumference of the tubular material to obtain a connecting web between the pockets of the bag which is narrower than the full width of the pockets.

Figure 4:
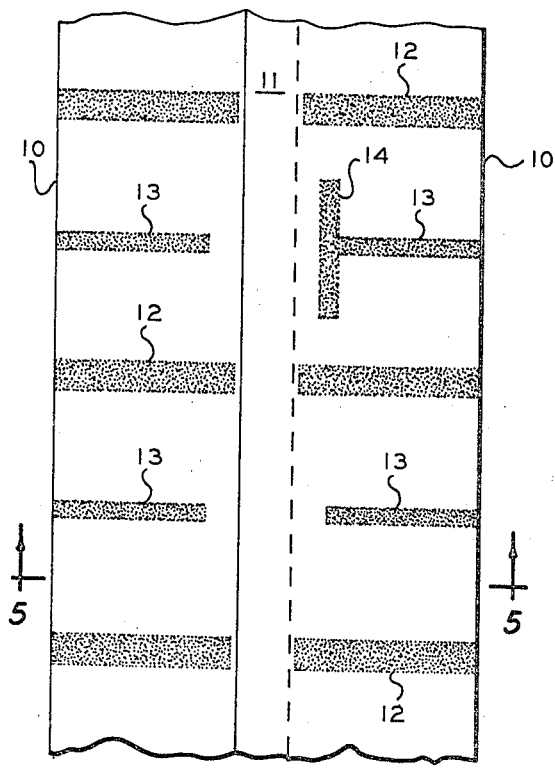
Figure 5:
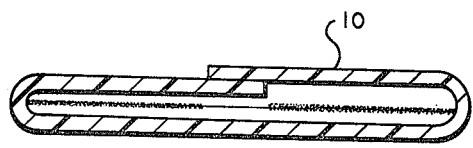

Viewing FIGURE 4, before or after cutting, the end most portions or other portions of the flaps formed by the overlap can be heat sealed, stitched or otherwise held together as by metallic fasteners or staples or by continuing the seal lines 12 completely across the material. Further, various other heat sealed lines such as lines 5 in FIGURE 2 and 13 in FIGURE 4 can be provided to make it more difficult for inserted items to leave the pockets or compartments. For example, heat seal line 14 can be provided at right angles to line 13, if desired. See FIGURE 4. A heat seal line such as 15 can be provided in one or more compartments of the bags shown in FIGURE 2 so that an item such as boomerang 16 once inserted will be retained within the pocket except by intelligent handling for its removal.

In lieu of folding over a continuum or sheet of material or plastic as shown in FIGURE 4, one can use a slit tube. Preferably, the tube upon slitting is folded over to form overlap at 11 as shown in FIGURE 4. However, it is not always necessary to form this overlap. Nor is it necesary to form this overlap exactly midway between the fold lines 10.

It is now evident that in lieu of the folded over material of FIGURE 4 or the slit tube just mentioned, it is within the scope of the invention to lay together the required number of sheets of material and to heat seal along the lines 10. Similarly, in FIGURE 2 by heat sealing along the longitudinal edges of two sheets of material, it will not be necessary to employ a tubular material. Use of tubular material for FIGURE 2 embodiment and of folded over material for FIGURE 4 embodiment are now preferred.

Further, it is evident, from a study of this disclosure, that there are provided continuous pieces of material which can be subdivided into bags. Accordingly, the continuous material can be placed onto rolls from which one or more bags at a time can be cut, as desired.

Figure 1:
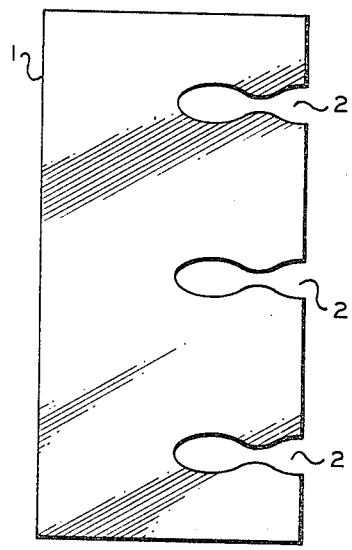
Figure 2:
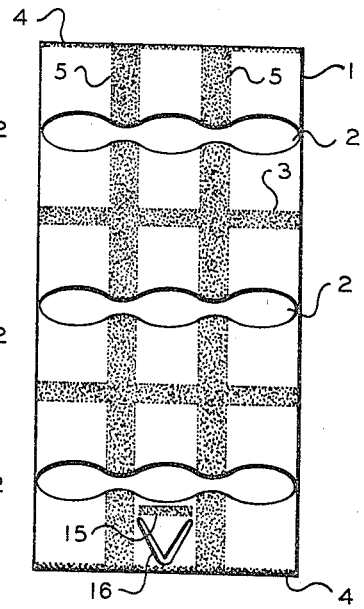
Figure 3:
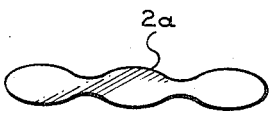

In the case in which there is a seal along the outer longitudinal edges, the individual bags, whether made according to FIGURE 1 or FIGURE 2, will have a substantially continuous heat seal extending down both sides of each bag pocket and across its bottoms.

It is within the scope of the invention to cut, say, at every other transverse seal. Thus, it is possible to cut off the roll, as it were, two bags at a time. Further, by like reasoning, it is posible to cut off three, four, or more bags at a time. This gives a plurality of adjacent compartments or pocekts into each of which there can be fitted or placed a part, card or other item of which a plurality are to be used but which are to be stored separated each from the other for ready, convenient, or other handling as when the parts should not be allowed to touch each other to prevent scratching thereof.

Ordinarily, as now disclosed, the invention contemplates an extended longitudinal piece from which the bags are cut transversely. However, it will be understood that in FIGURES 2 and 4 it is equally possible to contemplate that the bags will be cut from a prepared piece of material which will have a transverse dimension greater than the longitudinal dimension. Bags of very small to very large sizes can be made as will be understood upon study of this disclosure.

Though not a part of this invention, the material of which the bags are made, if it is not already a non-slip material, can be treated with an asphalt emulsion or have some grit or other material imbedded in its surface.

Reasonable variation and modification are possible within the scope of the foregoing disclosure, the drawing and the appended claims to the invention the essence of which is that there have been provided alternate modifications of bags and methods for making the same, the bags being of the saddle type which in one form have sealed seam portions along the vertical sides of the bag pockets in open, upright filling position and in another form having the sealed seams at the bottoms of the bag packets in set position and still in another form having a continuous seam extending down the two ends and across the bottoms of said pockets; the method in one embodiment comprising slitting or slotting or otherwise excising a portion of a flattened tubular or flat piece of extended fabric or film-like material, now having two thicknesses which can be or have been sealed or otherwise permanently closed or held together as by a closure portion or by stitching at portions across the material intermediate the slits or slots, bags being formed from the material by cutting at the closed or sealed portions and in another embodiment of the method comprising longitudinally folding together at least till they touch, preferably with some overlapping, the longitudinal end of the material from which the bags are to be made, sealing transversely of the material at spaced places along the folded material but preferably omitting the seal across at least the mid or intermediate longitudinal line of the folded material and cutting within the sealed portions to release a bag from the thus handled material; and any modifications of the method providing additional compartmentalizing stitching or seal lines to form compartments and/or partial compartments or retaining lines within the bag pockets.

I claim:

1. A substantially tubular piece of plastic film material consisting of a continuum of plastic having disposed transversely of its axis a plurality of spaced heat seals dividing said tubular material substantially into a plurality of sections by holding heat sealed together substantially diametrically opposite points of said material, at a place intermediate at least two of said seals a slit also extending substantially but not completely around said tubular material and, extending at least part way between at least two of said seals substantially at right angles to said seals and longitudinally of the tubular piece, but not across the said slit, a further heat seal holding together substantially diametrically opposite points of said tubular material.

2. A piece of material consisting of a single continuum of plastic film having opposite ends thereof folded over onto said material with an overlap of said ends, thus forming when the foldover is completed and the layers of material are counted, a double thickness of material adjacent each of said fold lines and a triple thickness at said overlay, at least the double thickness of material thus formed being heat sealed along a line substantially from one fold line thus made to the other fold line thue made, thus dividing said continuum into a plurality of joined members, each of which is available upon cutting as a saddle bag by cutting through intermediate the longitudinal edges of at least two consecutive heat seals, thus forming a two-pocket saddle bag.

3. A piece of material according to claim 2 wherein intermediate at least two of said heat seal lines and extending from at least said fold line but not to include the triple thickness there is provided at least one further heat seal holding together at least one point in each of said thicknesses.

4. A piece of material according to claim 2 wherein said further heat seal extends to form a compartmentalizing or object-retaining portion within at least one pocket of said bag.

References Cited

UNITED STATES PATENTS

| 1,279,171 | 9/1918 | Sullivan | 229—69 X |
| 2,628,013 | 2/1953 | Vogt | 229—69 X |
| 3,254,828 | 6/1966 | Lerner | 229—69 X |
| 3,363,826 | 1/1968 | Behler | 229—54 |

FOREIGN PATENTS 820,236  7/1937  France.

DAVID M. BOCKENEK, Primary Examiner

U.S. Cl. X.R.

229—56, 69